United States Patent [19]
Maltby, Jr. et al.

[11] 3,849,099
[45] Nov. 19, 1974

[54] SCANNING APPARATUS FOR MEASURING GLASS TEMPERATURES

[75] Inventors: Robert E. Maltby, Jr., Perrysburg; Thomas B. O'Connell, Maumee, both of Ohio

[73] Assignee: Libbey-Owens-Ford Company, Toledo, Ohio

[22] Filed: Nov. 15, 1973

[21] Appl. No.: 416,168

[52] U.S. Cl. .......................... 65/158, 65/29, 65/162
[51] Int. Cl. ............................................. C03b 25/04
[58] Field of Search ........................ 65/158, 162, 29

[56] References Cited
UNITED STATES PATENTS
3,479,172  11/1969  McCown et al. ..................... 65/158
3,744,985  7/1973   Peternel ............................ 65/162 X

*Primary Examiner*—Arthur D. Kellogg
*Attorney, Agent, or Firm*—Collins, Oberlin & Darr

[57] ABSTRACT

An apparatus for traversing a pyrometer across the top surface of a ribbon of glass to observe its temperature profile as it is conveyed through an annealing lehr and wherein the roof of the lehr is provided with a transversely elongated, vertically extending labyrinth passageway opening into the interior of the lehr. The pyrometer, positioned within the passageway with its scanning head substantially flush with the ceiling of the lehr, is mounted for movement in a rectilinear path along the elongation of the passageway by a carriage movably mounted for reciprocation externally of and along the top opening of the passageway. A flexible closure disposed within and extending along the elongation of the passageway together with the labyrinth path thereof effectively seals the interior of the lehr from the outside atmosphere, but yet permits transverse movement of the pyrometer with the passageway.

10 Claims, 7 Drawing Figures

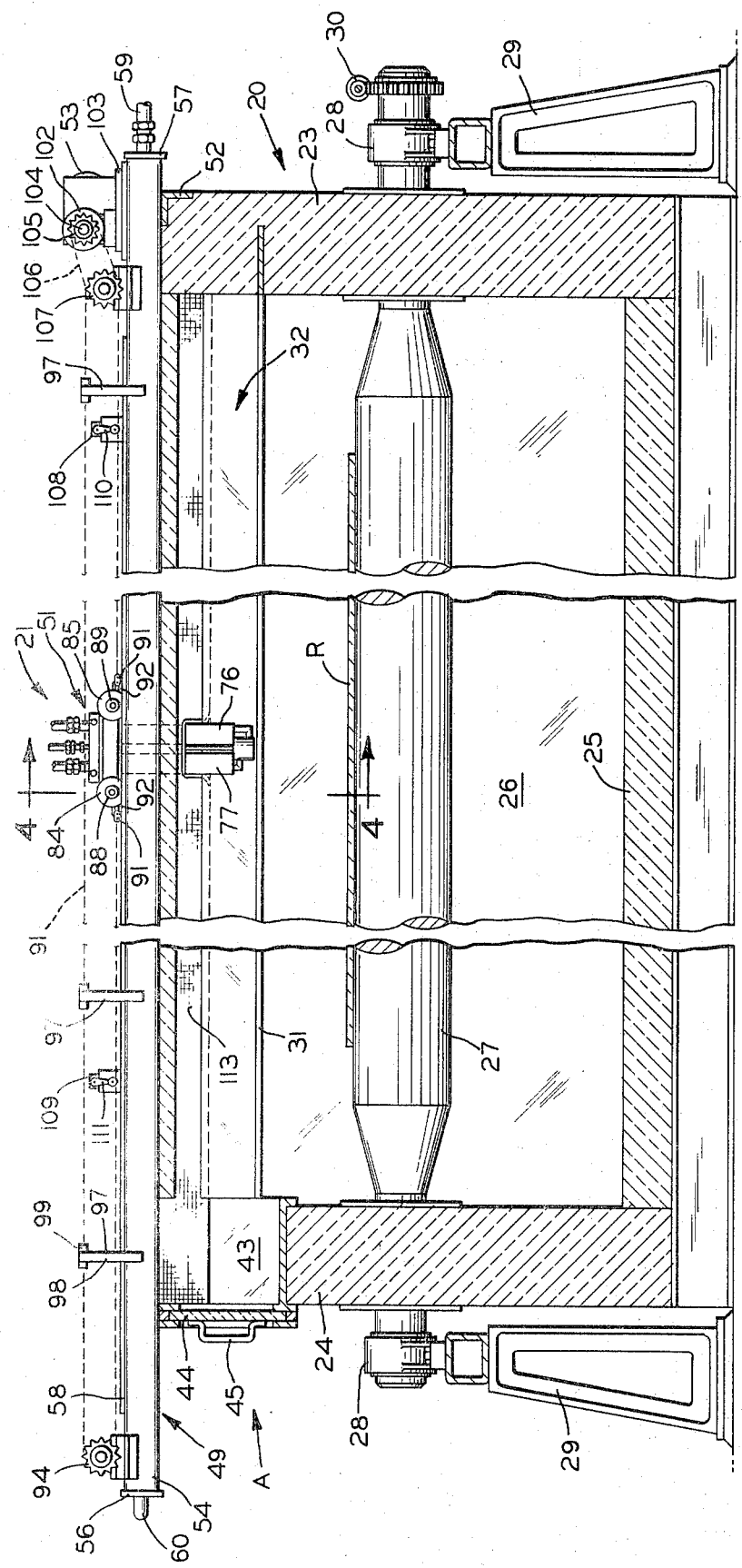

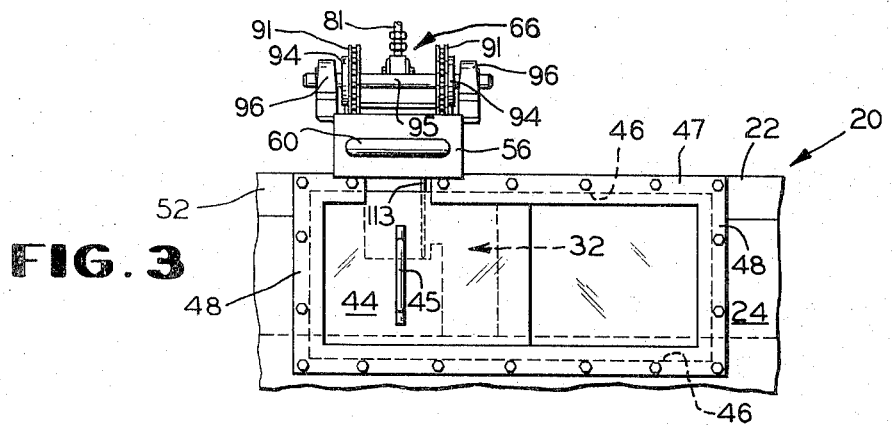
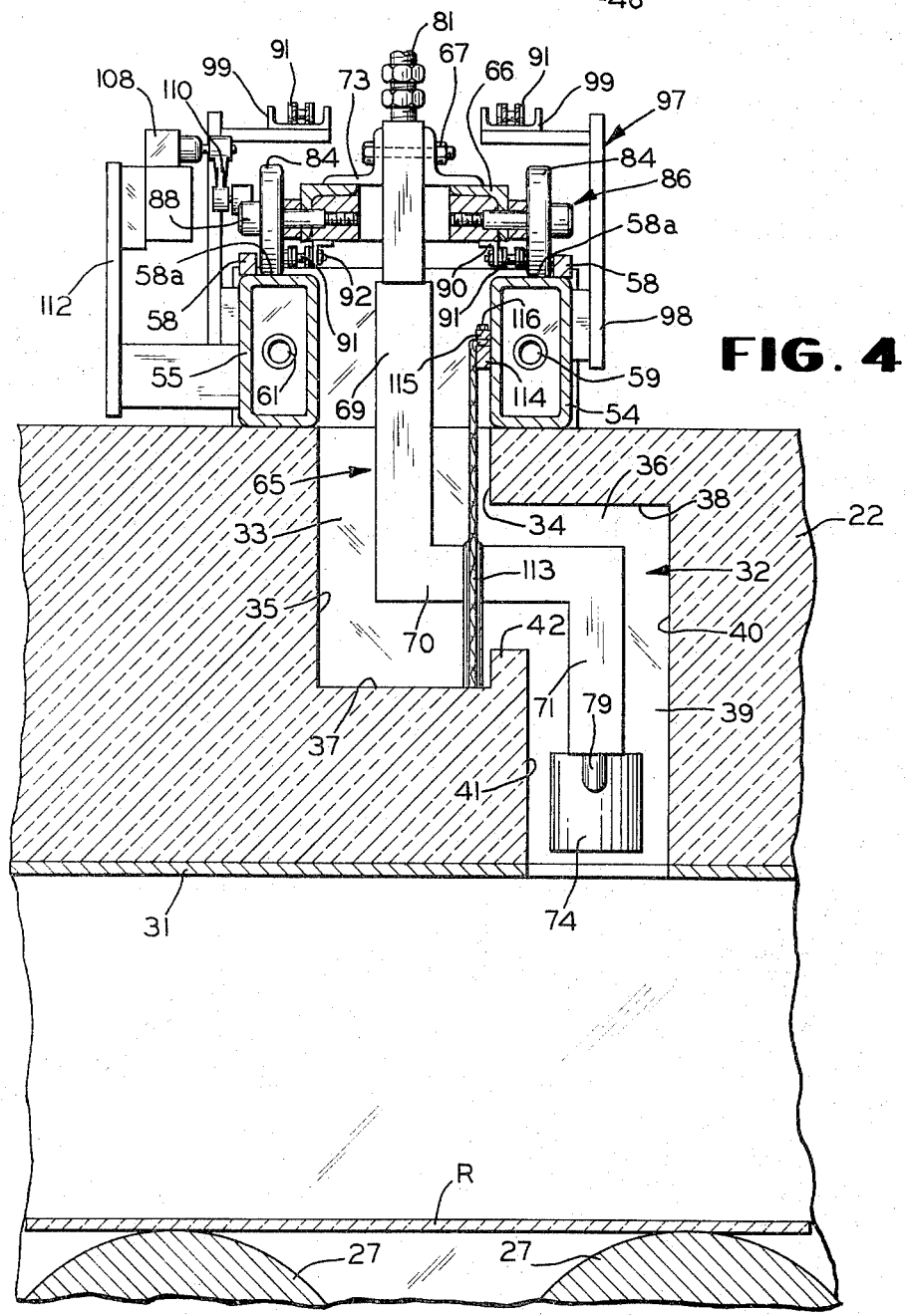
FIG. 3
FIG. 4

SCANNING APPARATUS FOR MEASURING GLASS TEMPERATURES

BACKGROUND OF THE INVENTION

1. Field of the Invention

This invention generally relates to scanning devices for measuring the temperature profile across a moving article, and more particularly to apparatus for traversing a pyrometer in a reciprocal rectilinear path across a moving glass ribbon from the roof of a lehr.

2. Description of the Prior Art

In the production of glass, it is customary to produce a continuous ribbon of glass from a molten mass and pass this plastic ribbon through an annealing lehr. The primary purposes of passing the glass ribbon through the lehr are: (1) to cool the ribbon from its hot plastic condition to a rigid glass ribbon at approximately ambient temperature; (2) to maintain a temperature distribution in the glass during its annealing to produce a permanent stress pattern such as inducing compressive stresses near the edges of the ribbon and tensile stresses in the remainder of the ribbon; and (3) to maintain a temperature distribution to retain the desired stress pattern in the ribbon during cooling from below its annealing range to ambient temperature to avoid breakage thereof in the lehr.

In a conventional annealing process, the temperature longitudinally of the lehr is progressively decreased from a temperature range at its inlet end from above the annealing range of the glass (i.e., from about 1,300° to 1,100° F.) through the annealing range (i.e., about 1,100° to 900° F.) and then through a cooling range (i.e., about 900° to 400° F.) so that the cooling of the glass ribbon passing therethrough takes place in a controlled gradual manner so as to control the permanent strain in the cooled ribbon.

It is well known that in cooling a continuous ribbon of glass to its surrounding ambient temperature after it has been annealed, excessive and localized residual strains may be set up in the glass if the temperature distribution of the annealing range across the ribbon is not maintained and if the glass is cooled too rapidly. Normally such a lehr employs some type of heating elements in its annealing zone for regulating the amount and distribution of heat therein. If desired, cooling elements may be provided in the cooling zone of the lehr to also control the temporary regional stresses and strains below the annealing range to produce a desired cooling pattern longitudinally and transversely within the lehr. In this process, particularly in the cooling zone, stray air currents may occur within the lehr, usually from the cooling elements which normally employ a medium such as cool air. These stray air currents present a problem due to the "shock" cooling of the glass ribbon which can damage a ribbon because of an excessive rate of cooling in localized areas, resulting in localized stresses of great magnitude. Inasmuch as small temperature differentials cause large variations in stresses, i.e., in most commercial glass compositions a one degree temperature differential will produce a stress differential of 50 p.s.i., such stresses may cause ribbon cross breaks or longitudinal splits commonly referred to as "snakes".

Heretofore, scanning devices such as shown in U.S. Pat. No. 3,479,172, issued Nov. 18, 1969, have been employed to measure and control the temperature profile across a glass ribbon as it moves through a lehr for controlling the cooling pattern thereof. As shown therein, the apparatus has an elongated tubular housing which extends transversely across the lehr between a pair of conveyor rolls beneath the ribbon of glass. A pyrometer for scanning the lower surface of the glass ribbon is moved back and forth along the housing within a bath of cool water.

One problem arising from this construction is that the absorption of appreciable amounts of heat by the apparatus within the lehr and by the water employed to maintain the pyrometer at a constant temperature, tends to upset the equilibrium of the lehr's atmosphere and, thus, to change the temperature distribution in the glass ribbon.

Another problem thereof is that the ratio of the length of the tubular housing relative to its cross sectional area is so large that the heat it absorbs due to the high operating temperatures within the lehr tends to bow the housing into the glass ribbon. Also, the absorption of heat by the moving parts of the apparatus may cause them to expand and/or warp and, thus, "bind" or lock-up.

SUMMARY OF THE INVENTION

Generally speaking, the present invention overcomes these problems by placing its scanning apparatus, except for the face of the pyrometer, wholly outside of the interior of the lehr. Specifically, the apparatus according to this invention has a frame mounted on the roof of the lehr adjacent the top opening of a transversely elongated, vertically extending labyrinth passageway provided in the roof. A pyrometer supported by a movable housing projects into the passageway to a position adjacent the bottom opening thereof, and is reciprocated therealong by a carriage movably mounted on the frame and driven by a reversible drive means. A flexible closure disposed across the passageway, together with the labyrinth path thereof, prevents the flow of stray air currents into or from the interior of the lehr.

An access port provided in one side wall of the lehr in communication with one end of the passageway permits the pyrometer and its support housing to be moved externally of the lehr for access thereto. A door is provided on the side wall to close off the access port and passageway from the outside atmosphere.

The frame of the apparatus in contact with the lehr roof, and the pyrometer and support housing, are cooled by heat absorbing mediums such as water and air passing through conduits to ensure operation of the apparatus and maintain the pyrometer at a constant temperature.

OBJECTS AND ADVANTAGES

Thus, an object of this invention is to provide a simple, efficient and economical scanning apparatus which is not adversely affected by the high operating temperatures necessary within a lehr.

Another object of this invention is to provide such apparatus with means for effectively sealing a passageway through which a pyrometer projects into the interior of the lehr to prevent the ingress or egress of stray air currents.

A further object of this invention is to provide the apparatus with means for easy access to the pyrometer and efficient and effective cooling means.

BRIEF DESCRIPTION OF THE DRAWINGS

In the drawings, wherein like numerals are employed to designate like parts throughout the same:

FIG. 1 is a transverse, vertical sectional view of an annealing lehr having the features of the present invention incorporated therewith;

FIG. 2 is a top plan view of the apparatus as shown in FIG. 1;

FIG. 3 is an enlarged, fragmentary view of a side elevation taken in the direction of arrow A in FIG. 1, particularly showing the access port and passageway door;

FIG. 4 is an enlarged, fragmentary, longitudinal vertical sectional view taken substantially along line 4—4 in FIG. 1;

DESCRIPTION OF THE PREFERRED EMBODIMENT

Figure 5:
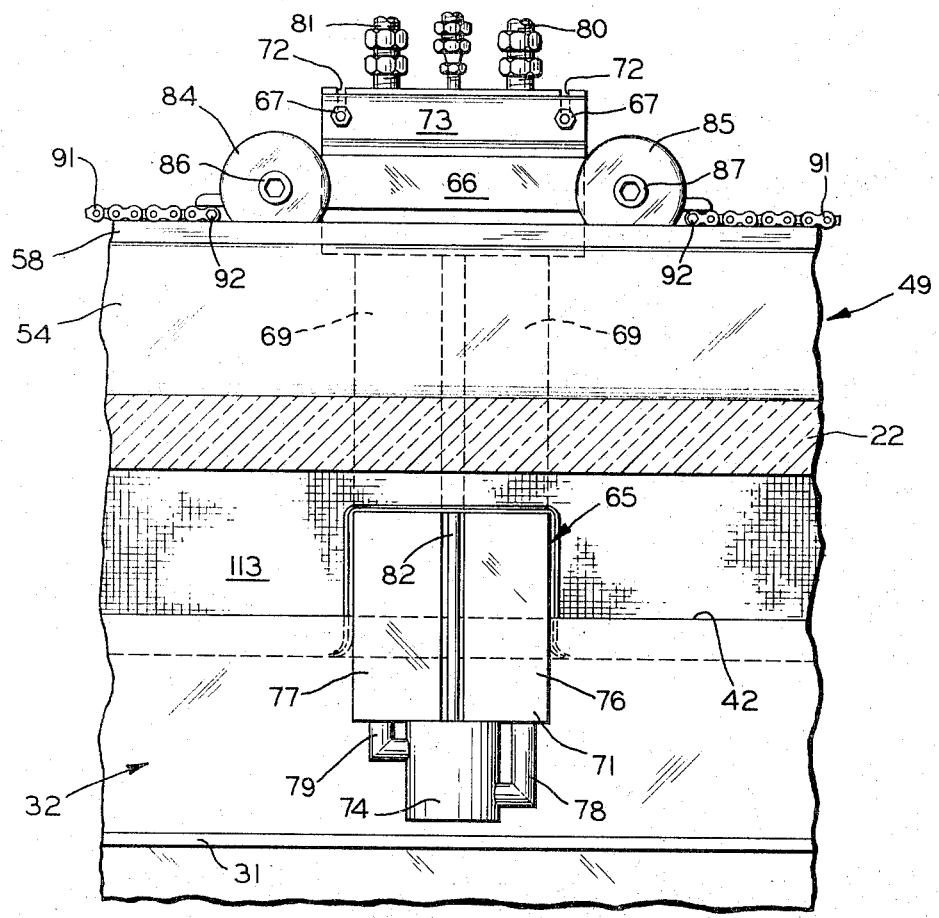
FIG. 5 is an enlarged, fragmentary view of the scanning device per se shown in FIG. 1.

Although the apparatus constructed in accordance with this invention will be specifically described in connection with the observation of the temperature profile across a moving glass ribbon to predict temporary regional stresses contained therein caused in part by stray air currents while the ribbon is being cooled from below its annealing range to ambient temperature, it can also be used to measure and control, in conjunction with other means, the laminar stresses set up in the glass ribbon during its annealing period.

In FIG. 1, there is illustrated a portion of a conventional annealing lehr 20 which is provided with a scanning apparatus 21 constructed in accordance with this invention.

As shown, the lehr 20 is of the elongated tunnel-type through which a continuous ribbon of glass R is transported and in which the ribbon R is subjected to decreasing temperature environments in order to provide a controlled stress pattern and to release excessive localized strains that may exist therein. The lehr 20 includes a roof 22, side walls 23 and 24, and a floor 25, all of which are formed of a heat insulating material to define a tunnel 26 insulated from its surrounding ambient atmosphere. The lehr 20 also includes a conveyor system comprising a plurality of longitudinally spaced rolls 27 (only one shown) extending transversely of the lehr 20 which have their opposite ends projecting through the side walls 23 and 24 and received in bearings 28 supported on pedestals 29 in spaced relation above the floor 25. These conveyor rolls 27 are driven in common by a gear drive 30 from a source of power (not shown) to move the ribbon of glass R through the lehr 20.

The roof 22 of the lehr 20, as illustrated in FIGS. 1, 4, and 5, is constructed of a refractory material and a metal ceiling plate 31 and is provided with a transversely elongated vertically extending labyrinth-type passageway 32. This passageway 32 includes an upper vertical portion 33 defined by vertical walls 34 and 35, opening in the top of the roof 22, a central horizontal portion 36 defined by horizontal walls 37 and 38, and a lower vertical portion 39 defined by vertical walls 40 and 41 opening through the ceiling plate 31. The junction of the lower horizontal wall 37 and the vertical wall 41 is provided with an upstanding lip 42, the purpose of which will be described hereinafter. As shown in FIG. 1, the passageway 32 extends transversely across the roof 22 from one side wall 23 into an access port 43 in the other side wall 24 which provides for passage of a portion of the scanning apparatus 21 into and out of the interior of the lehr 20. A sliding door 44 is provided to open and close the port 43. As shown in FIGS. 1 and 3, the door 44 is provided with a handle 45 so that it can be moved along horizontal grooves 46 defined by a rectangular frame 47 spaced from the side wall 24. The frame has vertical sides 48 which provide stops for the door 44. As shown in FIG. 3, the door 44 forms one side of the passageway 32 when it is in its closed position and, when it is moved to its open position, opens the passageway 32 via the port 43 to the outside of the lehr 20.

Generally stated, the scanning apparatus 21 of this invention includes a frame generally designated by the numeral 49 and a conventional radiation pyrometer 50 such as shown in the aforementioned U.S. Pat. No. 3,479,172. The radiation pyrometer is carried by a carriage 51 movably mounted on the frame 49 whereby the pyrometer 50 is carried forward and backward in a reciprocal path along the elongation of the passageway 32 across the roof 22 of the lehr 20. As disclosed in FIGS. 1 and 2, the frame 49 is mounted on the roof 22 along the top opening of the passageway 32 to structural support members 52 forming part of the framework of the lehr 20. Also, it will be seen that one end of the frame 49 is located outwardly of lehr wall 24 over the access port 43 so that the pyrometer 50 can be moved externally of the passageway 32 for repair or replacement thereof. A source of power such as a motor 53 is mounted on the other end of the frame 49 for moving the carriage 51.

More particularly, as illustrated in FIGS. 1 and 2, the frame 49 includes a pair of spaced apart elongated tubular rail members 54 and 55 tied together by end plates 56 and 57. The outer edge of the top surface of each rail member 54 and 55 is provided with an elongated guide member 58 so as to provide flange-like track surfaces 58a for guiding the carriage 51 when it is moved therealong.

Due to the conventional or necessitated use of metallic elements to construct the frame 49, such as illustratively shown, it is realized that the frame will be bodily susceptible to absorption of appreciable amounts of heat from the lehr 20, and thus, tend to twist and warp and consequently interfere with the movement of the carriage 51 therealong. Thus, a cooling medium such as water is passed through the tubular rails 54 and 55 to prevent warping thereof. To this end, one end of the tubular rail 54 is provided with an inlet connection 59 connected to a source of water (not shown) and its other end is connected by a pipe 60 to the adjacent end of the other tubular rail 55. The opposite end of this tubular rail 55 may be connected to a drain (not shown) via an outlet 61.

Figure 6:
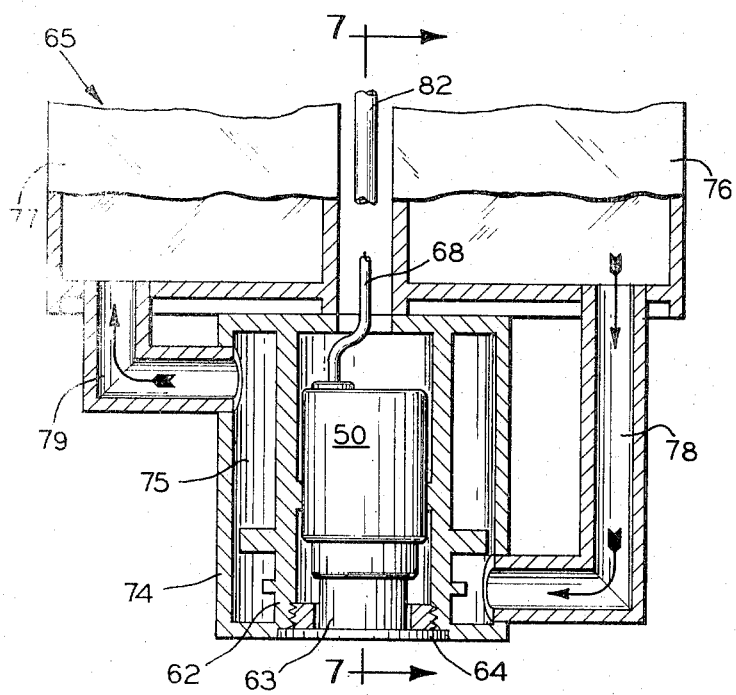
FIG. 6 is an elongated, fragmentary sectional view of the lower portion of the scanning device.
Figure 7:
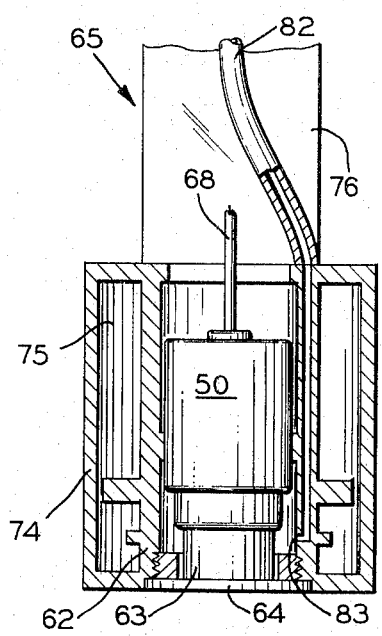
FIG. 7 is an enlarged, fragmentary sectional view taken along line 7—7 in FIG. 6.

As shown in FIGS. 6 and 7, the pyrometer 50 is bodily received in a housing 62 with its scanning head 63 facing the top surface of the glass ribbon R and is held therein by a cap 64 threadly attached to the housing 62. This housing 62 is affixed as by welding to a support structure 65 which is attached to the body 66 of the carriage 51 by means of bolt and nut fasteners 67. The pyrometer 50 may be connected via its electrical conductor leads 68 to suitable indicating apparatus (not shown).

As particularly shown in FIGS. 4 and 5, the pyrometer housing support structure 65 is configured to lie within the passageway 32. Thus, the support structure 65 includes an upper vertical section 69, a horizontal intermediate section 70, and a lower vertical section 71 to which the housing 62 is affixed. The upper section 69 is provided with means, such as slots 72, which project between vertical side flanges 73 provided on the carriage body 66 through which the pair of bolt and nut fasteners 67 extend.

It is, of course, important that the pyrometer 50 be maintained at a substantially constant temperature at all times so that its observation will accurately reflect the temperature of the glass ribbon R. For this purpose, the housing 62 is provided with a jacket 74 which together with housing 62 defines a chamber 75 through which a cooling heat absorbing medium such as water is circulated. To this end, the upper vertical, horizontal intermediate and lower vertical sections 69, 70 and 71, respectively, of the pyrometer support structure 65 comprise a pair of tanks 76 and 77 which communicate with the chamber 75 of the housing 62 via inlet and outlet conduits 78 and 79, respectively, (see FIG. 6). The upper section 69 of the tank 76 is provided with an inlet 80 (see FIG. 5) which is adapted to be connected with a source of water (not shown). Likewise, the upper section 69 of the tank 77 is provided with an outlet 81 which may be connected to a drain (not shown). Also, cool air may be circulated around the pyrometer 50 within the housing 62 through a pipe 82 via an outlet port 83 provided in the housing 62 adjacent the pyrometer scanning head 63 (see FIG. 7) which is connected to a source of air (not shown).

The carriage 51 for traversing the pyrometer 50 transversely across the glass ribbon R, has two pairs of wheels 84 and 85 for moving it along the track surfaces 58a on the rail members 54 and 55. These wheels are mounted for rotation on axle stub shafts 86 and 87 having hubs 88 and 89, respectively, which are threadably received in the carriage body 66. Also, each end of the carriage 51 is provided with a pair of angle clips 90 (see FIG. 4) that are connected to the free ends of a pair of sprocket chains 91 by bolt and nut fasteners 92. The described ends of the chains constitute the termni of the lower flight of the chains 91 which traverse the track surfaces 58a, while the looped end portions thereof are entrained about drive sprockets 93 and idler sprockets 94 located at the opposite ends of the frame 49. The idler sprockets 94 are suitably fixed on a shaft 95 which is journalled at its ends in bearing blocks 96 affixed to one end of the frame 49.

Suitable chain retaining elements 97 are provided for the upper flights of the chains 91 which, as shown, comprise a plurality of spaced apart upstanding posts 98 affixed to the outer side of rail members 54 and 55. U-shaped track sections 99 are affixed to the upper ends of these posts for supporting the upper flights of the chains 91.

In order to move the carriage 51 forwardly and backwardly along the rails 54 and 55, it will be noted in FIGS. 1 and 2 that the drive sprockets 93 are suitably fixed on a shaft 100 which is journalled at its ends in bearing blocks 101 affixed to the other end of the frame 49. The aforementioned motor 53 is associated with a reduction unit 102 on a common platform 103 affixed to the frame 49 and has an output shaft 104 equipped with a sprocket 105. By means of a sprocket chain 106, sprocket 105 is adapted to operatively drive a related sprocket 107 keyed to one end of the shaft 100. In this connection, it has been previously indicated that the motor 53 is reversible so that through the use of conventional limit switches, the drive sprockets 93 can be alternately operated to move the carriage 51 forwardly and rearwardly across the roof 22 of the lehr 20.

As herein provided, the reciprocal movements of the carriage 51 are controlled by spaced apart limit switches 108 and 109 which are located intermediate the ends of the rail 55. These limit switches 108 and 109 are adapted to be engaged by the hubs 88 and 89 of the axle shafts 86 and 87 respectively. As shown, the limit switches 108 and 109 have arms 110 and 111 respectively which, when engaged by co-operating hub 88 or 89, closes the electrical contacts (not shown) thereof. Accordingly, when the carriage 51 reaches the intended terminus of its movement in one direction, for example, to the right in FIG. 1, the switch 108 will be actuated to change polarity and reverse the motor 53 to move the carriage 51 in the opposite direction. As shown in FIG. 4, the switches 108 and 109 are similarly mounted by brackets 112 mounted on the rail 55.

In order to prevent the ingress or egress of stray air currents into the interior of the lehr 20 which might upset the equilibrium thereof, a flexible closure 113 is provided in the passageway 32. As illustrated in FIGS. 1 and 4, the closure 113 comprises a sheet of durable heat resistant material, such as glass fiber cloth, which is suspended from one of the rails 54 by being clamped between a pair of elongated bar members 114 and 115. The bar 114 is fixedly secured to the inner face of the rail 55 and the bar 115 is detachably secured to the top of the bar 114 by cap screws 116. As clearly shown in FIG. 4, the lower edge of the closure 113 hangs adjacent the lip 42 in the labyrinth passageway 32 to form a barrier to the flow of air currents therebeneath. As shown in FIG. 5, the closure 113 is draped around the intermediate horizontal section 70 of the support 65. Accordingly, as the support 65 is moved across the passageway 32, the closure 113 will continually rise and fall on each side thereof and provide a barrier to the flow of air currents into or from the interior of the lehr 20.

It is to be understood that the form of the invention herewith shown and described is to be taken as an illustrative embodiment only of the same and that various changes in the shape, size and arrangement of the parts may be resorted to without departing from the spirit of the invention.

We claim:

1. In a scanning apparatus for observing the temperature profile across an article as it is conveyed through a lehr, including a roof in said lehr and a pyrometer for observing said temperature profile, the improvement comprising:

a. a transversely elongated passageway extending through said roof;
b. a frame mounted on said roof adjacent said passageway;
c. pyrometer support means projecting into said passageway and movably mounted on said frame for reciprocation along the elongation of said passageway; and
d. closure means for continuously sealing said support means in said passageway as said support means is moved therealong.

2. A scanning apparatus for observing the temperature profile across an article as claimed in claim 1, wherein said passageway has a labyrinth path and said closure means is a flexible curtain which depends from said frame across said passageway and co-operates with said labyrinth path to close said passageway around said support means.

3. A scanning apparatus for observing the temperature profile across an article as claimed in claim 1, wherein said pyrometer support means includes a chamber and means for circulating a cooling medium through said chamber for cooling said pyrometer.

4. A scanning apparatus for observing the temperature profile of an article as claimed in claim 2, including side access means opening into said labyrinth passageway for permitting said pyrometer support means to be moved externally of said lehr.

5. A scanning apparatus for observing the temperature profile of an article as claimed in claim 4, wherein said access means comprises a door movable from a closed position to an open position.

6. A scanning apparatus for observing the temperature profile of an article as claimed in claim 1, wherein said frame comprises a pair of spaced parallel tubular members, a conduit connecting said tubular members together, and means for circulating a cooling medium through said tubular members for cooling said scanning apparatus.

7. A scanning apparatus for observing the temperature profile of an article as claimed in claim 6, including means for moving said support means along the elongation of said passageway.

8. A scanning apparatus for observing the temperature profile of an article as claimed in claim 7, wherein said moving means includes a guide rail affixed to each tubular member and said support means includes wheels rollable along said guide rails and a reversible drive means.

9. A scanning apparatus for observing the temperature profile of an article as claimed in claim 8, wherein said reversible drive means includes separate automatically operated limit switches for controlling the reciprocal motion of said support means by said drive means.

10. A scanning apparatus for observing the temperature profile of an article as claimed in claim 2, wherein said flexible curtain is a heat-resistant cloth which is draped over said support means.

* * * * *